United States Patent [19]
Furuhata et al.

[11] Patent Number: 4,746,996
[45] Date of Patent: May 24, 1988

[54] SKEW ERROR CORRECTION CIRCUIT FOR VIDEO SIGNAL REPRODUCING APPARATUS

[75] Inventors: Takashi Furuhata; Hitoaki Owashi, both of Yokohama; Michio Hibi, Osaka, all of Japan

[73] Assignee: Hitachi, Ltd., Tokyo, Japan

[21] Appl. No.: 748,906

[22] Filed: Jun. 26, 1985

[30] Foreign Application Priority Data

Jun. 26, 1984 [JP] Japan ................. 59-131700

[51] Int. Cl.$^4$ ............................................. H04N 5/78
[52] U.S. Cl. ...................................... 360/36.2; 360/76
[58] Field of Search ................... 360/27, 76, 78, 36.2, 360/70

[56] References Cited

U.S. PATENT DOCUMENTS

| | | | |
|---|---|---|---|
| 4,065,787 | 12/1977 | Owen et al. | 358/160 |
| 4,353,099 | 10/1982 | Shum et al. | 360/27 |
| 4,368,492 | 1/1983 | Chamberlain et al. | 360/76 X |
| 4,389,678 | 6/1983 | Mizukami et al. | 360/36.2 X |
| 4,438,456 | 3/1984 | Toshinaka | 358/148 |
| 4,577,236 | 3/1986 | Takanushi | 360/36.2 X |

FOREIGN PATENT DOCUMENTS 56-25254 3/1981 Japan ..................................... 360/76
56-87225 7/1981 Japan ..................................... 360/76

OTHER PUBLICATIONS

IBM Technical Disclosure Bulletin; vol. 18, No. 1, Jun. 1975, pp. 164–165, Grimes: "Skew Detector and Corrector for a Disk, Drum or Tape Storage".

Primary Examiner—Aristotelis M. Psitos
Attorney, Agent, or Firm—Antonelli, Terry & Wands

[57] ABSTRACT

A skew error correction device for a video signal in a television receiver or the like is disclosed. An oscillator produces an oscillation output signal of a constant frequency which is phase-synchronized with horizontal synchronization information included in an input video signal, and the output signal is used as a write clock. In a vertical blanking period, the oscillation output signal or a frequency-divided signal thereof is phase-compared with an output of a reference signal generator of a predetermined frequency or a frequency-divided signal thereof, and a phase error signal is negatively fed back to voltage control means which voltage-controls the oscillation frequency of the oscillator. Thus, the oscillation frequency is stabilized without using an AFC circuit and a skew error in the input video signal is eliminated.

7 Claims, 8 Drawing Sheets

SKEW ERROR CORRECTION CIRCUIT FOR VIDEO SIGNAL REPRODUCING APPARATUS

CROSS-REFERENCES TO RELATED APPLICATIONS

This application relates to a U.S. application Ser. No. 658,021 filed Oct. 5, 1984 by the present inventors and assigned to the present assignee (which corresponds to European patent application No. 841119043 filed Oct. 4, 1984), based on Japanese patent application Nos. 59-131699 and 58-190761.

BACKGROUND OF THE INVENTION

The present invention relates to a time base error compensation device of a video signal in a helical scan type magnetic recording and reproducing apparatus having a plurality of magnetic heads, and more particularly to a skew distortion elimination device suitable for an apparatus which records or reproduces video signal on or from a magnetic tape by switching a plurality of magnetic heads during one vertical scan period.

In a magnetic recording and reproducing apparatus such as a VTR or a video reproducing apparatus such as a video disk player, a time base error is caused in a reproduced video signal by a relative positional movement between a signal detection device such as a magnetic head or pickup head and a record medium such as a magnetic tape or disk. If the time base error is slow, the image on the playback screen jitters, and if a rapid change (skew) is included in the time base, the image on the playback screen is distorted. Accordingly, the time base error of the reproduced video signal involves an essential problem of degrading stability of the playback screen.

Figure 2:
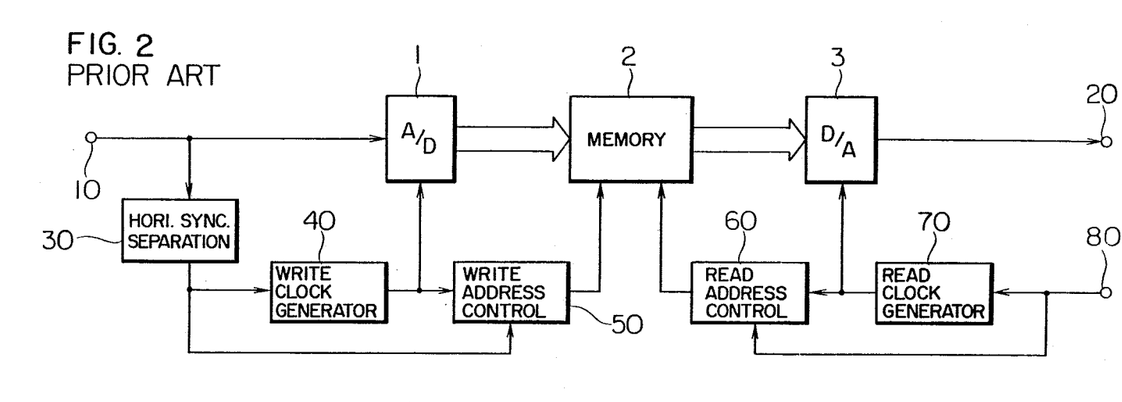
FIG. 2 is a block diagram of a prior art time base error compensation device.

In order to compensate for the time base error, a time base correction device as shown in FIG. 2 has been used in the past (Japanese literature, VTR Technology, Chapter 6, Broadcasting Technology Vol. 5, Nippon Hoso Kyokai).

In FIG. 2, numeral 10 denotes an input terminal to which a video signal including a time base error is applied, numeral 20 denotes an output terminal from which a video signal compensated for the time base error is outputted, numeral 1 denotes an A/D converter for converting the input video signal to a digital signal, numeral 2 denotes a memory such as a RAM, and numeral 30 denotes a horizontal synchronization signal separation circuit. A horizontal synchronization signal including the time base error, extracted by the horizontal synchronization signal separation circuit 30 is supplied to a write clock generator 40 and a write address control circuit 50.

The write clock generator 40 generates a write clock which reflects the time base error in the input video signal applied to the input terminal 10, in synchronism with the horizontal synchronization signal. The write address control circuit 50 produces a write address signal in response to the write clock.

Accordingly, the video signal including the time base error, applied to the terminal 10 is sequentially converted to a digital signal by the A/D converter 1 in synchronism with the write clock from the write clock generator 40 and written into the memory 2 in accordance with the address signal from the write address control circuit 50.

On the other hand, a stable reference synchronization signal free from the time base error is applied to a terminal 80, and a read clock generator 70 generates a read clock in synchronism with the reference synchronization signal. A read address control circuit 60 produces an address signal in synchronism with the read clock.

Accordingly, the video signal data stored in the memory 2 is sequentially read for each horizontal scan period in accordance with the address from the read address control circuit 60, and the read data is sequentially converted to analog signal by a D/A converter 3 in synchronism with the read clock generated by the read clock generator 70. Accordingly, a stable video signal free from the time base error is outputted at the terminal 20.

As seen from the above description of operation, the performance of the time base error compensation device is influenced by the method for generating the write clock by the write clock generator 40, and it is an important factor of the device how to generate the write clock which exactly follows the time base error of the input video signal.

Figure 3:
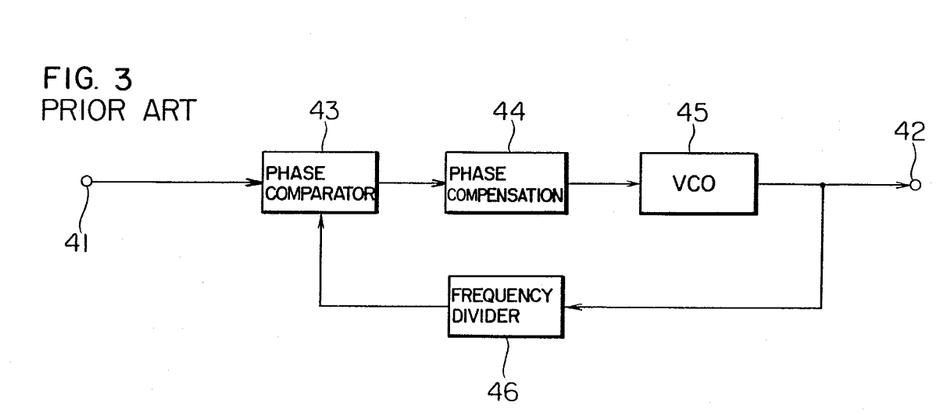
FIG. 3 is a block diagram of a prior art write clock generator.

The write clock generator 40 is usually constructed by an automatic frequency control (AFC) circuit shown in FIG. 3, in which the horizontal synchronization signal from the horizontal synchronization signal separation circuit 30 is applied to one input terminal of a phase comparator 43 through a terminal 41. Numeral 45 denotes a voltage-controlled oscillator having a center frequency which is substantially equal to the frequency of the read clock from the circuit 70 of FIG. 2. The output of the voltage-controlled oscillator 45 is frequency-divided by a frequency divider 46 which produces a signal having the same frequency as the horizontal scan frequency of the input video signal. The horizontal synchronization signal applied to the terminal 41 and the output signal from the frequency divider 46 are phase-compared by the phase comparator 43 which produces an error voltage representing a phase difference therebetween. It is supplied to the voltage-controlled oscillator 45 through a phase compensation circuit 44 as a control voltage.

The above circuits constitute the AFC circuit. Through a negative feedback control thereof, the voltage-controlled oscillator 45 produces the output signal which follows the time base error of the horizontal synchronization signal of the input video signal and the output signal is outputted from a terminal 42 as the write clock.

The prior art write clock generator has thus been described. Because of the negative feedback control, the AFC circuit of the prior art system does not correctly follow the time base error when the frequency of the time base error is high or the time base error occurs rapidly like a skew. If the response speed of the AFC circuit is increased to enhance the compensation capability, the AFC circuit is sensitive to a noise included in the input video signal and the AFC circuit is disturbed by the noise. As a result, the operation is very unstable. Further, if the response speed of the AFC circuit is increased, the AFC circuit goes beyond the synchronization pull-in range if the time base error is large and the time base error cannot be compensated.

On the other hand, a new standard of television signal system is under discussion to increase a realistic feeling and a resolution power to compare with those of a current television signal system. This system which aims at high quality of image and sound is called a high-definition television system or so-called MUSE (Multiple Sub-Nyquist Encoding). In the high-definition television system, horizontal and vertical resolution powers are approximately twice as high as those of the currently used television system. Accordingly, a frequency band required for transmission is approximately four times as wide as the currently used television signal band.

When the magnetic recording and reproducing apparatus for the currently used television signal is used to record and reproduce the high-definition television signal, only one quarter of the frequency band of the high-definition television signal can be recorded and reproduced.

In the helical scan type magnetic recording and reproducing head, the high-definition television signal can be recorded if the rotation speed of the head cylinder is increased four times.

Figure 7:
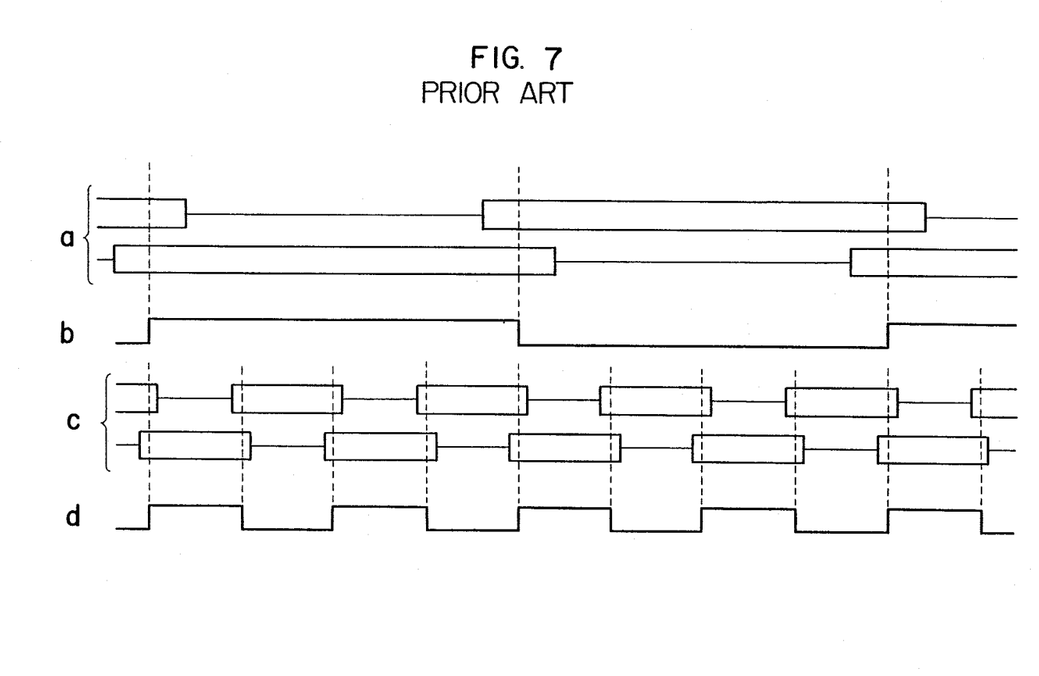

FIG. 7 shows reproduced signals of a video signal by a two-head helical scan type magnetic recording and reproducing apparatus. FIG. 7a shows waveforms of recorded and reproduced video signals for the currently used television signal, FIG. 7c shows waveforms of recorded and reproduced video signals for the high-definition television signal with the rotation speed of the head cylinder increased four times, FIG. 7b shows a head switching signal used when the current television signal is recorded and reproduced at the normal rotation speed of the head cylinder, and FIG. 7d shows a head switching signal used when the high-definition television signal is recorded and reproduced with the head cylinder rotated at the speed of four times.

In the helical scan type magnetic recording and reproducing apparatus, if the recorded track length expands or shrinks due to change in tape tension, or the tape itself expands or shrinks, or the signal is reproduced by a different apparatus than the apparatus used to record the signal and there is a slight difference between the head mount positions or the cylinder diameters of those two apparatus, there is a time difference between the signal reproduced by a first head and the signal reproduced by a second head at a head switching area.

Figure 8:
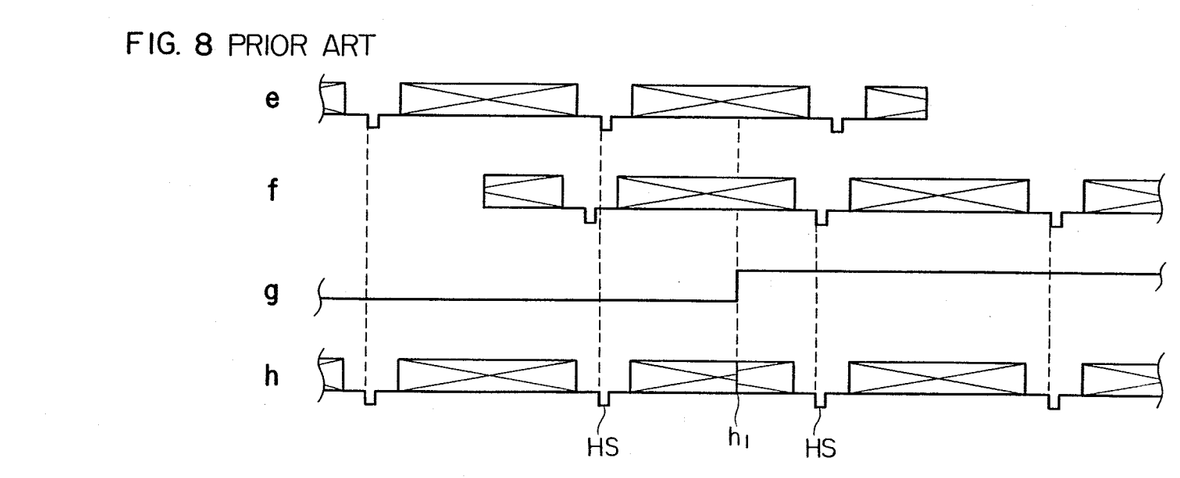

FIG. 8 shows an enlarged video of the reproduced signals shown in FIGS. 3a or 3c in the vicinity of the signal switching area. FIG. 8e shows the signal reproduced by the first head and FIG. 8f shows the signal reproduced by the second head. The actual recorded and reproduced signals are frequency-modulated but the video signals are shown in FIG. 8 to illustrate the time discontinuity. FIG. 8g shows a head switching signal and FIG. 8h shows a series of video signal after switching from the signal reproduced by the first head to the signal reproduced by the second head.

As described above, there occurs a time difference between the signal reproduced by the first head and the signal reproduced by the second head due to the expansion or shrinkage of the track length. As a result, when the reproduced signal is switched, the video signal at the switching point is discontinuous as shown by $h_1$ in FIG. 8h and the horizontal synchronization signal is phase-discontinuous as shown by HS.

Figure 9:
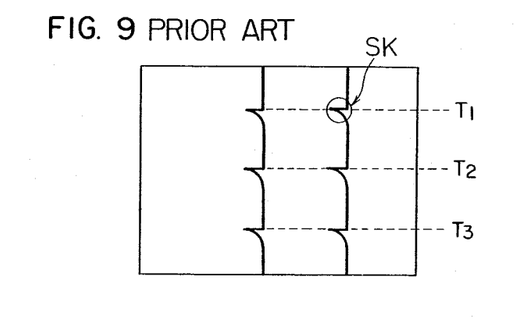
FIG. 9 shows a video signal with skew distortions displayed on a televsion screen.

FIG. 9 shows a reproduced image on a television screen when the signal is recorded and reproduced by the head cylinder rotated at the speed of four times. Since the phase of the horizontal synchronization signal is discontinuous at head switching points $T_1$, $T_2$ and $T_3$ the vertical image on the screen is discontinuous and skew distortions SK appear in the pull-in period due to a time constant of a horizontal synchronization AFC circuit of a television receiver.

In the case of the normal rotation speed shown in FIGS. 7a and 7b, only one skew distortion appears in one vertical scan period and it appears in a vertical blanking period and a raster overscan area. Accordingly, the skew distortion is not essentially observed on the television screen.

In the case of the four times rotation speed shown in FIGS. 7c and 7d, four skew distortions appear in one vertical scan period and at least three skew distortions appear on the screen as shown in FIG. 9. Accordingly, the image quality of the television screen is highly degraded.

SUMMARY OF THE INVENTION

It is an object of the present invention to provide skew error correction circuit which can stability and positively eliminate a time base error in a video signal.

In accordance with the present invention, an oscillation output signal of a constant frequency which is always phase-synchronized with horizontal synchronization information included in an input video signal is produced by an oscillation circuit and it is used as a sampling clock for the input video signal and a memory write clock. In a vertical blanking period, the oscillation output or a frequency-divided signal thereof is phase-compared with an output of a reference signal of a predetermined frequency or a frequency-divided signal thereof, and a phase error signal is negatively fed back to voltage-controlled means which voltage-controls the oscillation frequency of the oscillation circuit. In this manner, the oscillation frequency is stabilized without an AFC circuit and the time base error in the input video signal is stably and positively eliminated.

BRIEF DESCRIPTION OF THE DRAWINGS

FIGS. 4(a-d) and 5(a-h) show waveforms in the circuit of FIG. 1,

FIGS. 7a-7d show reproduced waveforms by a two-head helical scan type magnetic recording and reproducing apparatus, FIGS. 8e-8h are enlarged views of the waveforms shown in FIG. 7.

DESCRIPTION OF THE PREFERRED EMBODIMENTS

Figure 1:
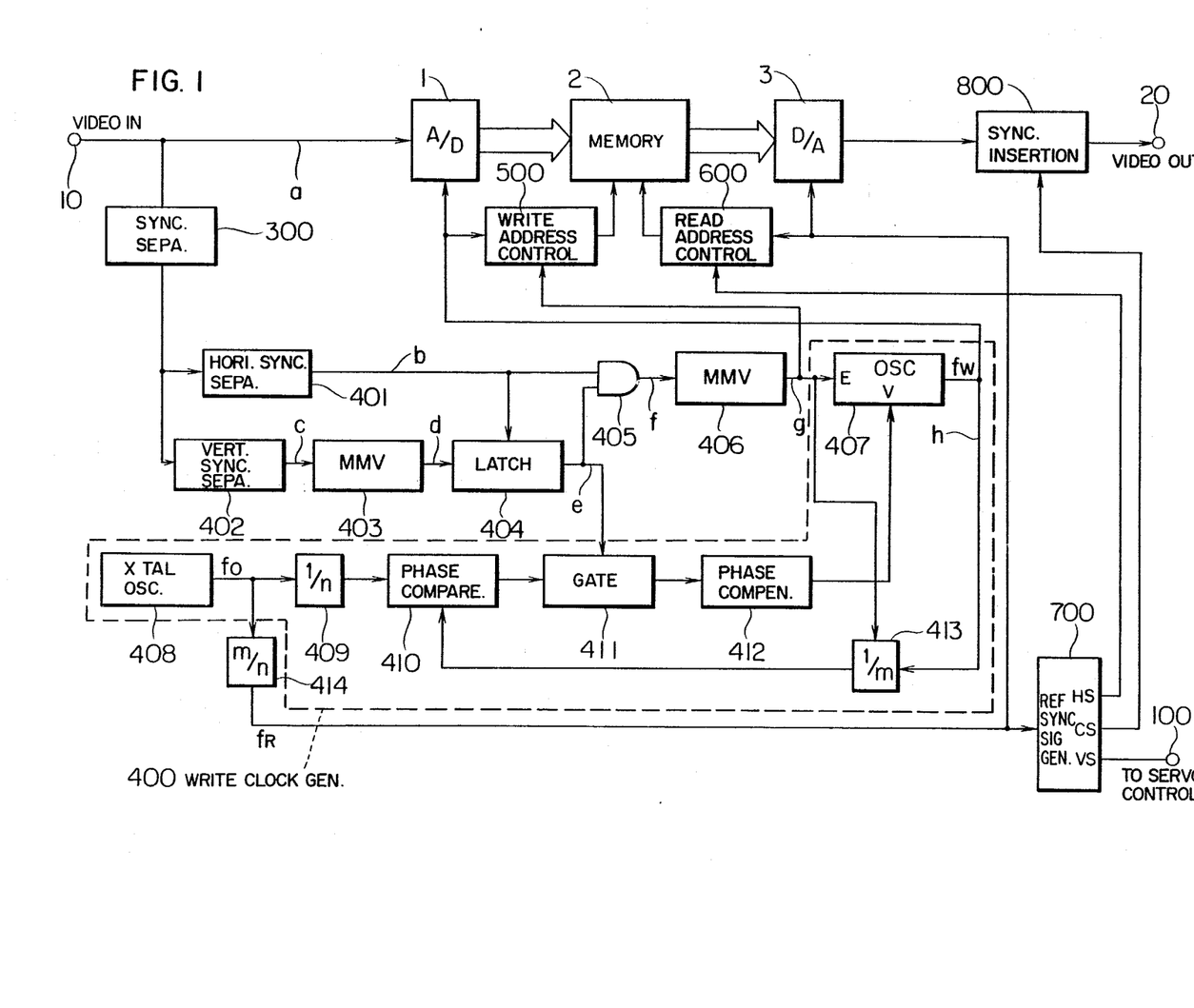
FIG. 1 is a block diagram of one embodiment of the present invention.
Figure 4:
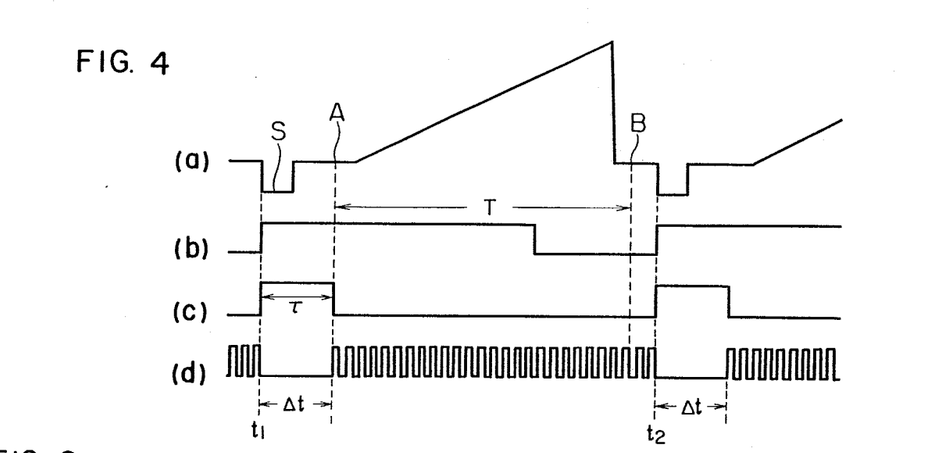
Figure 5:
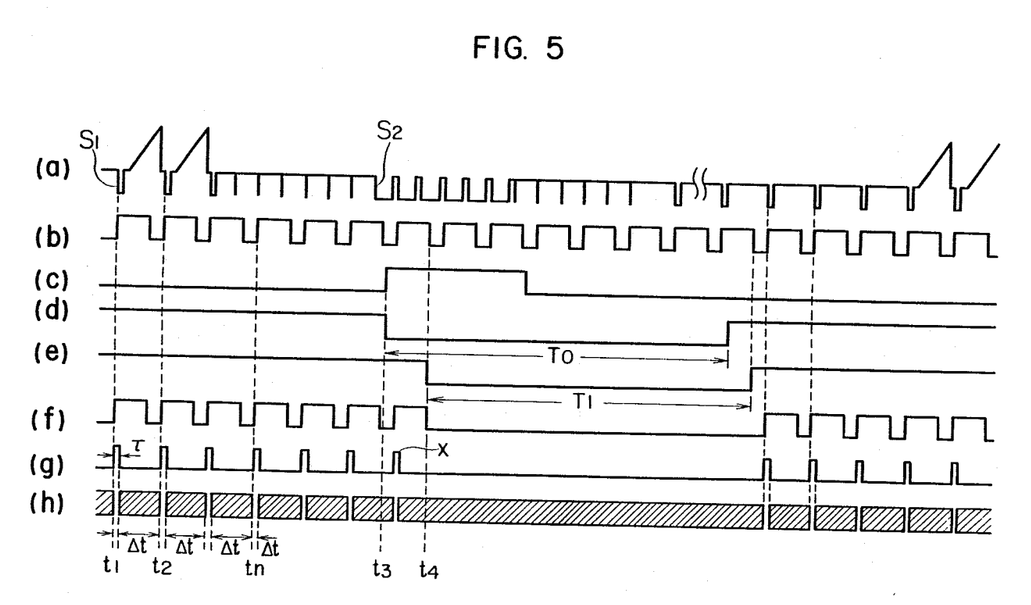

FIG. 1 is a block diagram of one embodiment of a time base error compensation device of the present invention, and FIGS. 4 and 5 show waveforms to illustrate the operation. FIG. 4 shows a portion of a horizontal scan period of an input video signal and FIG. 5 shows a portion of a vertical blanking period.

In FIG. 1, a broken line block 400 shows a write clock generator of the present invention. Numeral 1 denotes an A/D converter, numeral 2 denotes a memory, and numeral 3 denotes a D/A converter. Those are identical to those shown in the prior art apparatus of FIG. 2 and designated by the same numerals. Numeral 300 denotes a synchronization signal separation circuit, numeral 500 denotes a write address control circuit, numeral 600 denotes a read address control circuit, numeral 700 denotes a reference synchronization signal generator and numeral 800 denotes a synchronization signal insertion circuit.

Referring to the waveforms of FIGS. 4 and 5, the operation of the write clock generator 400 is explained.

Synchronization information (S in FIG. 4a; $S_1$, $S_2$ in FIG. 5a) included in an input video signal (FIG. 4a, FIG. 5a) applied at a terminal 10 is separated by the synchronization signal separation circuit 300. Horizontal synchronization information included in the output signal of the synchronization signal separation circuit 300 is separated by a horizontal synchronization signal separation circuit 401 at times $t_1$, $t_2$, $t_n$ (FIG. 4b, FIG. 5b). Vertical synchronization information included in the output signal of the synchronization signal separation circuit 300 is separated by a vertical synchronization signal separation circuit 402 at time $t_3$ (FIG. 5c). After time $t_3$, a monostable multivibrator 403 is triggered by the output signal of the vertical synchronization signal separation circuit 402 to produce an output signal (FIG. 5d) having a pulse width $T_o$ in a vertical blanking period of the input video signal a. The output signal d of the monostable multivibrator 403 is synchronized with a negative-going edge of the output signal b of the horizontal synchronization signal separation circuit 401 in a latch circuit 404 at time $t_4$. The output signal e of the latch circuit 404 is of low (L) level for a predetermined time period $T_1$ to represent the vertical blanking period of the input video signal a, as shown in FIG. 5e. The output signal b of the horizontal synchronization signal separation circuit 401 is gated by an AND gate 405 by the output signal e of the latch circuit 404, and an output signal thereof (FIG. 5f, FIG. 4b) triggers a monostable multivibrator 406 at times $t_1$, $t_2$, $t_n$ so that it produces a write start pulse having a duration τ (FIG. 4c, FIG. 5g).

The output signal of the monostable multivibrator 406 or the write start pulse g is inhibited by the gate 405 during the period $T_1$ corresponding to the vertical blanking period and hence it is not produced during the period $T_1$, as shown in FIG. 5.

An oscillator 407 starts and stops oscillation in synchronism with the write start pulse g applied to an enable terminal E from the monostable multivibrator 406 and varies an oscillation frequency in accordance with a control voltage applied to a voltage control input terminal V. A specific example is a Texas Instruments a stable multivibrator type oscillator IC with an enable terminal (SN 74124N).

When the write start pulse g is applied to the enable terminal E of the oscillator 407, the oscillator 407 stops the oscillation and produces a low (L) level output signal while the start pulse g is at high (H) level ($\Delta T = \tau$), and when the start pulse g changes from the H level to the L level after the time period $\Delta t$, the oscilkator 407 starts oscillation and produces a continuous oscillation output during the L level period of the start pulse g, as shown in FIG. 4d or FIG. 5h.

Since the start pulse g from the monostable multivibrator 406 is produced only for the period other than the vertical blanking period $T_1$, the output signal from the oscillator 407 is synchronized in the vertical blanking period $T_1$ by the immediately preceding start pulse (X in FIG. 5g).

In the present embodiment, the oscillation output of the oscillator 407 is phase-synchronized with an external stable oscillation output by a PLL (phase-locked loop) circuit during the vertical blanking period $T_1$ so that the oscillation frequency of the oscillator 407 has no frequency deviation and is stable.

The PLL circuit is constructed by a crystal oscillator 408 which generates a reference clock of a stable frequency, a frequency divider 409, a phase comparator 410, a gate circuit 411, a phase compensation circuit 412, the oscillator 407 and a frequency divider 413, and the oscillation output from the oscillator 407 is phase-synchronized with the reference clock of the crystal oscillator 408.

The output signal from the crystal oscillator 408 is frequency-divided by the frequency divider 409 by a factor of n and the frequency-divided signal is supplied to one input terminal of the phase comparator 410. The output signal of the oscillator 407 is frequency divided by the frequency divider 413 by a factor of m and the frequency-divided signal is supplied to the other input terminal of the phase comparator 410. The frequency division stages of the frequency divider 413 are reset by the write start pulse g from the monostable multivibrator 406.

The phase comparator 410 compares the phases of the 1/n and 1/m frequency-divided signals and produces an error signal representing a phase difference therebetween. The gate circuit 411 responds to the output signal e from the latch circuit 404 to gate the output signal of the phase comparator 410 for the vertical blanking period $T_1$ to the phase compensation circuit 412. The gate circuit 411 is closed during other than the period $T_1$ so that the error signal is not supplied from the phase comparator 410 to the phase compensation circuit 412 and the gate circuit 411 exhibits a sufficiently high output impedance.

As a result, the phase error signal from the phase comparator 410 is supplied to the phase compensation circuit 412 through the gate circuit 411 only for the vertical blanking period $T_1$, and the phase error signal is held in the phase compensation circuit 412 during the period other than $T_1$. The phase compensation circuit 412 may be constructed by an integration circuit, and the phase error signal is sufficiently smoothened by the phase compensation circuit 412 and compensated for characteristic so that the characteristic of the PLL circuit is sufficiently stabilized. The output signal from the phase compensation circuit 412 is supplied to the voltage control circuit terminal V of the oscillator 407.

The oscillation output of the oscillator 407 is thus phase-synchronized with the stable clock from the crystal oscillator 408 through the PLL negative feedback control. The oscillation frequency $f_w$ is give by $$f_w = \frac{m}{n} \cdot f_o \qquad (1)$$

where $f_o$ is the frequency of the reference clock of the crystal oscillator 408. The frequency $f_w$ may be set by appropriately selecting m, n and $f_o$, and the oscillator 407 produces the stable oscillation output without deviation.

Unlike the AFC circuit shown in FIG. 3, the PLL circuit of the present embodiment is a control system having a reference signal of a constant frequency. Accordingly, if the frequency of the reference signal of the crystal oscillator 408 is selected to be equal to the oscillation frequency of the oscillator 407, that is, if m/n=1, a maximum phase deviation at the phase synchronization pull-in is ±½ period ($\pi$ rad.). Thus, a sufficiently high response speed is attained and the phase variation of the oscillation output of the oscillator 407 hardly occurs, or if it occurs, it is slight. Since the phase of the oscillation output is always synchronized with the write start pulse g from the monostable multivibrator 406 corresponding to the synchronization information included in the input video signal, the influence of the phase variation is substantially reduced.

The output signal h from the oscillator 407 is used as a sampling clock for the input video signal a and a write clock for the memory 2.

The input video signal a (FIG. 4a, FIG. 5a) applied to the terminal 10 is supplied to the A/D converter 1 where it is sampled by the clock signal h from the oscillator 407 and converted to a digital signal. The write address control circuit 500 may be a counter which starts counting in response to the write start pulse g generated by the monostable multivibrator 406 in each horizontal scan period, and counts the clock signals h from the oscillator 407 by a predetermined number of times. Thus, the write address control circuit 500 produces an address signal representing the count of the counter 500 for a period T (FIG. 4) and it is supplied to the memory 2 as the write address signal. The address signal is sequentially updated by the write start pulse g from the monostable multivibrator 406 for each horizontal scan period, and the output from the A/D converter 1 is sequentially written into the memory $\tau$ for each horizontal scan period.

The time period T and the pulse width $\tau$ of the write start pulse are selected such that the start point to write into the memory for each horizontal scan period (A in FIG. 4a) and the end point (B in FIG. 4a) are included in the horizontal blanking period of the horizontal scan of the input video signal. Thus, necessary and sufficient video information of the input video signal a is written into the memory 2.

As seen from the above operation, since the sampling clock h (or memory write clock) is generated in phase-synchronism with the synchronization information included in the input video signal a, it does not include time base error due to the sampling quantization and it is not affected by the time base error included in the input video signal a. Further, the sampling clock h includes no frequency deviation because of the PLL negative feedback control.

In FIG. 1, the reference clock signal from the crystal oscillator 408 is frequency-divided by a frequency divider 414 by a factor of m/n, and the output therefrom is supplied to the read address control circuit 600 as a read clock, and to the D/A converter 3 and the reference synchronization signal generator 700. The frequency $f_R$ of the read clock of the frequency divider 414 is given by $$f_R = \frac{m}{n} \cdot f_o \quad (2)$$

From the equations (1) and (2), it is seen that the frequency $f_R$ of the read clock from the frequency divider 414 and the frequency $f_w$ of the write clock from the oscillator 407 are equal.

The clock from the frequency divider 414 is frequency-divided by the reference synchronization signal 700 which produces a reference synchronization signal CS having the same frequency as the synchronization signal in the input video signal a (S in FIG. 4a; $S_1$, $S_2$ in FIG. 5a), a read start pulse HS at the same timing as the write start pulse in FIG. 4c for the horizontal synchronization signal in the reference synchronization signal CS, and a reference vertical synchronization signal VS.

The read address control circuit 600 may be a counter as is the write address control circuit 500, which starts counting in response to the read start pulse HS from the reference synchronization signal generation circuit 700 for each horiozntal scan period. Then, the read address control circuit 600 produces the address signal representing the count of the counter for the time period T during which the clocks from the frequency divider 414, and it is supplied to the memory 2 as the address signal.

The address signal is sequentially reset by the read start pulse HS from the reference synchronization signal generator 700 for each horizontal scan period so that the video information stored in the memory 2 is sequentially read for each horizontal scan period and the output signal of the memory 2 is converted to an analog signal by the D/A converter 3.

As seen from the above operation, since the write address signal from the write address control circuit 500 and the read address signal from the read address control circuit 600 are produced only during the period T excluding the horizontal blanking period of the input video signal a, the output singals from the memory 2 and the D/A converter 3 are composed into the video signal which does not include the horizontal blanking signal and the synchronization signal. The synchronization signal insertion circuit 800 inserts the reference synchronization signal CS supplied from the reference synchronization signal generator 700 into the output signal supplied from the D/A converter 3.

The reference vertical synchronization signal VS from the reference synchronization signal generator 700 is supplied to the terminal 100 as a reference signal for a servo control unit (not shown).

The servo control unit includes a tracking control device which controls a relative position between a signal detector such as a magnetic head or a pickup head and a record medium such as a magnetic tape or a disk in a magnetic recording and reproducing apparatus such as a VTR or a video reproducing apparatus such as a video disk player, which uses the time base error compensation device of FIG. 1, in order to exactly reproduce the signal.

The reference vertical synchronization signal VS from the terminal 100 is applied to the servo control unit so that the input video signal a applied to the terminal 10 is phase-synchronized with the reference vertical synchronization signal. More specifically, it is servo controlled such that the phase of the reference vertical synchronization signal is retarded with respect to the phase of the vertical synchronization signal of the input video signal.

Through the servo control, the write operation to the memory 2 is preceded to the read operation. As a result, the video information written into the memory 2 does not drop out and all information are exactly read with the stable and variation-free time base. The blanking information and the synchronization information deleted when the video information was written into the memory 2 are supplemented by the time base reference synchronization signal CS in the synchronization signal insertion circuit 800. Accordingly, the stable video signal free from the time base error included in the input video signal is produced at the terminal 20.

Since the frequency $f_w$ of the write clock and the frequency $f_R$ of the read clock are PLL controlled to be equal to each other, the time base of the input video signal is not expanded or shrinked so that only the time base variation is eliminated, and a distortion does not appear on the television screen. Further, since the write clock is generated in synchronism with the synchronization information of the input video signal, the write clock generator 400 is not disturbed by the rapid time base error such as skew and the oscillator 407 exactly follows the rapid time base error to stably generate the write clock.

In the present embodiment, the horizontal synchronization signal for each horizontal scan and the vertical synchronization signal for each vertical scan are used as the synchronization information of the video signal, although the present invention is not limited thereto. For example, the present invention is applicable to a television system having one horizontal synchronization information allotted to a plurality of (e.g. two) horizontal scan periods, or a television system having a plurality of synchronization information (for example, synchronization information for luminance information, and synchronization information for chrominance information) allotted to one horizontal scan period. Further, the present invention is applicable to not only the television system having the negative synchronization information as shown in FIGS. 4 and 5 but also a television system having a positive synchronization information and a television system which uses the synchronization signal multiplexed in a portion of the horizontal blanking information.

Figure 6:
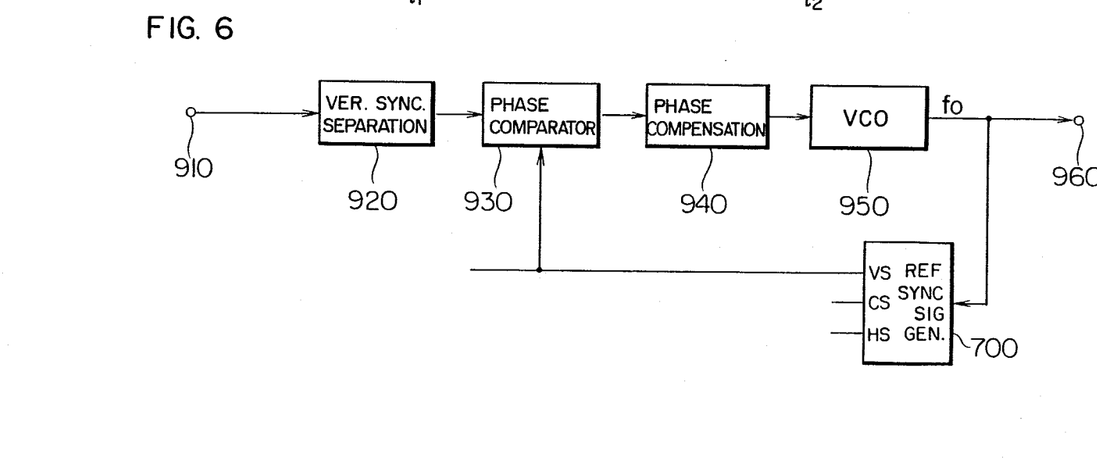
FIG. 6 is a block diagram of another embodiment of the time base error compensation device of the present invention which is operated by external synchronization.

In the embodiment of FIG. 1, the reference clock $f_o$ is generated by the crystal oscillator 408 and the reference synchronization signal CS is generated by the reference synchronization signal generator 700. Alternatively, the reference synchronization signal CS may be synchronously coupled with an external signal. In FIG. 6, numeral 700 denotes the reference synchronization signal generator shown in FIG. 1 and it generates the reference synchronization signal CS, the reference vertical synchronization signal VS and the read start pulse HS. An output clock from a voltage-controlled oscillator 950 is supplied to the input terminal of the reference synchronization signal generator 700. An external reference synchronization signal is applied to an input terminal 910 and a vertical synchronization signal is separated by a vertical synchronization signal separation circuit 920. The external reference vertical synchronization signal from the vertical synchronization signal separation circuit 920 and the internal reference vertical synchronization signal VS from the reference synchronization signal generator 700 are phase-compared by a phase comparator 930 which produces an error signal representing a phase difference therebetween. It is supplied to the oscillator 950 as a control voltage through a phase compensation circuit 940. The automatic phase control (APC) or AFC circuit is constructed by those elements and the internal reference vertical synchronization signal VS from the reference synchronization signal generator 700 is phase-synchronized with the external reference vertical synchronization signal. The oscillator 950 produces the output having the same frequency $f_o$ as the reference clock from the crystal oscillator 408 of FIG. 1.

When the oscillator 950 of FIG. 6 is used in place of the crystal oscillator 408 of FIG. 1, the time base error compensation device is externally synchronized.

Figure 10:
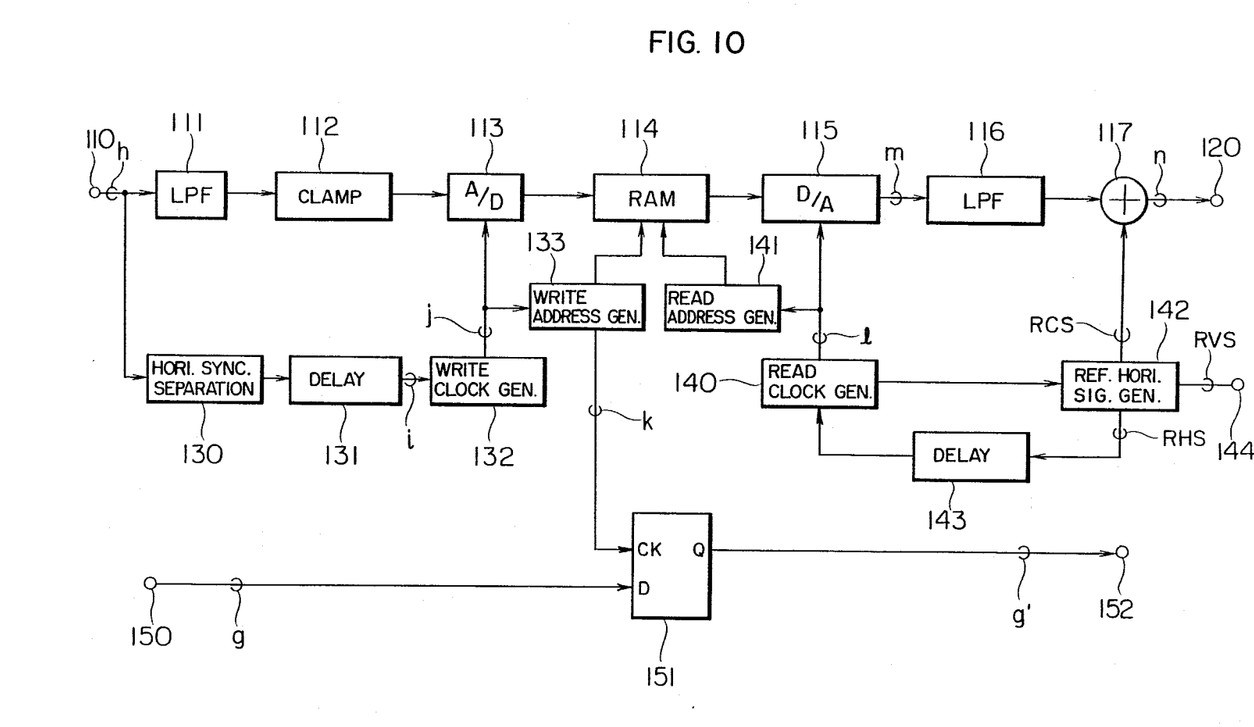
FIG. 10 is a block diagram of another embodiment of the present invention.
Figure 11:
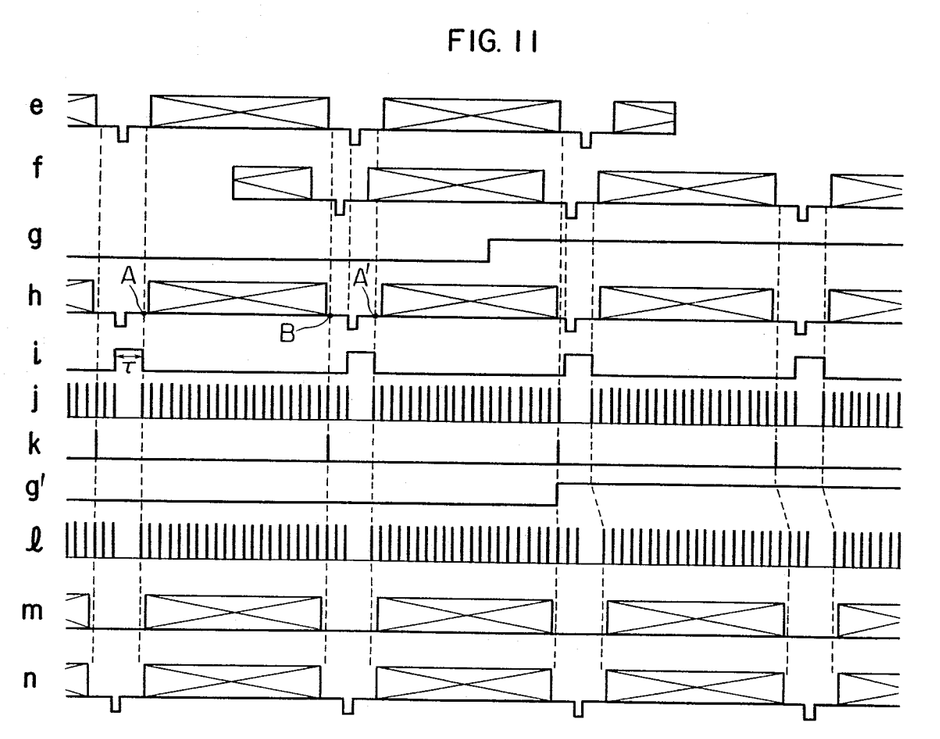
FIG. 11 shows waveforms in the circuit of FIG. 10.

An embodiment in which the present invention is applied to a skew error correction device is now explained. FIG. 10 is a block diagram of the embodiment of the skew error correction device of the present invention, and FIG. 11 shows waveforms in the circuit of FIG. 10. FIGS. 11e to 11g are duplicate of FIGS. 8e to 8g.

A frequency-modulated reproduced image signal h applied to a terminal 110 and shown in FIG. 11h is supplied to an A/D converter 113 through a low-pass filter (LPF) 111 and a clamp circuit 112. The LPF 111 suppresses the band of the video signal h to less than one half of the sampling frequency to prevent folded noise due to sampling in the A/D converter 113, and the clamp circuit 112 clamps a pedestal level of the video signal h to a fixed potential.

A portion of the reproduced video signal h which is displayed on a television screen is that of the waveform in FIG. 11h which is between points A and B (video information signal). A period from B to A' is a horizontal blanking period, during which the video signal is not displayed on the screen.

On the other hand, the video signal h is also supplied to a horizontal synchronization signal separation circuit 130 which separates synchronization information for the horizontal scan. The horizontal synchronization signal separated by the horizontal synchronization signal separation circuit 130 is supplied to a write clock generator 132 through a delay circuit 131.

The delay circuit 131 may be a monostable multivibrator which delays the horizontal synchronization signal to the point A by time $\tau$ as shown in FIG. 11i. FIG. 11j shows the output signal j of the write clock generator 132 of FIG. 10. The write clock generator 132 starts the oscillation in phase-synchronism with the negative going edge of the delayed horizontal synchronization signal i shown in FIG. 11i and continues the oscillation during the low (L) level of the signal i. When the signal i changes to the high (H) level, the write clock generator 132 stops the oscillation. The signal i is a start pulse to control the start point of the oscillation of the write clock j.

The oscillation frequency of the write clock generator 132 is selected such that the frequency of the write clock j is equal to a frequency of a read clock l to be described later. The write clock j is supplied to the A/D converter 113 and the write address generator 133.

The A/D converter 113 converts the portion A–B of the reproduced video signal shown in FIG. 11h to a digital signal in response to the write clock j and the output signal of the A/D converter 113 is supplied to a RAM 114. A write address generator 133 may be a counter which is cleared while the write clock j is stopped and starts counting from the point A and stops counting at the point B. The count of the counter is supplied to the RAM 114 as an address signal, and the A/D converted video signal is stored in the RAM 114 at the addresses designated by the address signal.

As described above, when the counter of the write address generator 133 counts the write clock j to the point B, the count reaches a predetermined count and the counter produces a signal k (FIG. 11k) indicating the end of sampling of the video information signal. The signal k is supplied to a clock input terminal CK of a D-type flip-flop 151.

A head switching signal g applied to a terminal 150 is supplied to a D input terminal of the D-type flip-flop 151 and it is latched by the end of sampling signal k. The latched head switching signal g' is produced at a terminal 152. The switching of a video signal e reproduced by one head and a video signal f reproduced by the other head is controlled by the head switching signal g' at the terminal 152 so that a series of video signal h is produced.

Since the signal g' is reversed only at the point B, the discontinuity of the video information signal when the head is switched is avoided. Since the head is switched immediately after the end of sampling, the period to the horizontal synchronization signal in the next line can be extended. Thus, even if the duration of the horizontal synchronization signal is shortened by the skew distortion, the horizontal synchronization signal in the next line is not lost but positively detected. The write clock generator 132 generates the write clock signal j in phase-synchronism with the horizontal synchronization signal even immediately after the head switching.

A read method is now explained, a read clock generator 140 may be a crystal oscillator which generates a stable and continuous signal, and a reference oscillation output thereof is supplied to a reference synchronization signal generator 142 which generates a stable reference synchronization signal.

The reference horizontal synchronization signal RHS generated by the synchronization signal generation circuit 142 is supplied to a read clock generator 140 through a delay circuit 143 having the same delay time $\tau$ as that of the delay circuit 131. The read clock generator 140 is triggered by the output signal from the delay circuit 143 to generate a read clock l shown in FIG. 11l which is stopped for the time period $\tau$ from the reference horizontal synchronization signal RHS. The clock l is supplied to the read address generator 141 and a D/A converter 115.

The read address generator 141 may be a counter as is the write address generator 133 and it is cleared while the read clock l is stopped. When the read clock l is applied, the read address generator 141 starts counting. The output signal of the read address generator 141 is supplied to the RAM 114 as a read address so that the video information signal stored in the RAM 114 is read out. The read video information signal is converted to an analog signal by a D/A converter 115 so that an analog video signal m with the synchronization signal eliminated is restored (FIG. 11).

The analog video signal m is supplied to a low-pass filter (LPF) 116 having a band width which is less than one half of the frequency of the read clock signal l to eliminate an undesired frequency band, and the output from the LPF 116 is supplied to an adder 117. In the adder 117, the reference synchronization signal RCS having the predetermined interval, generated by the reference synchronization signal generator 142 is added to the analog video signal m so that a video signal n shown in FIG. 11n having no change in the synchronization signal interval is produced. The video signal n is produced at a terminal 120.

The reference vertical synchronization signal RVS from the reference synchronization signal generation circuit 142 is supplied to a servo control unit (not shown) as a reference signal through a terminal 144.

The servo control unit may be a tracking control system for controlling a relative position between a signal detector such as a magnetic head and a record medium such as a magnetic tape in a magnetic recording and reproducing apparatus which uses the skew distortion elimination device of FIG. 10, in order to exactly reproduce the signal.

When the reference vertical synchronization signal RVS is supplied from the terminal 144 to the servo control unit, it is servo controlled such that the input video signal h from the terminal 110 is phase-synchronized with the reference vertical synchronization signal RVS. More specifically, it is servo controlled such that the phase of the reference vertical synchronization signal RVS is retarded with respect to the phase of the vertical synchronization signal of the input video signal h.

Through the servo control, the write operation into the RAM 114 is preceded to the read operation. As a result, the video signal stored in the RAM 114 is not dropped out and exactly read with variation free and stable time base. The blanking information and synchronization information which were delated when the video information was written into the RAM 114 are supplemented by the adder 117 by the stable time base, reference composite synchronization signal RCS. Accordingly, the stable video signal which is free from the skew distortion of the input video signal h is produced at the terminal 120. Thus, the image quality on the television screen is remarkably improved.

In the embodiment of FIG. 10, the RAM is used as the memory. Alternatively, a shift register, a CCD or delay line may be used as the memory.

The frequency of the write clock j in the embodiment shown in FIG. 10 is determined by the oscillation frequency of the write clock generator 132. The oscillation frequency changes with the fluctuation of a power supply voltage, change of a surrounding temperature and humidity and aging of circuit components. When a deviation from the stable read clock l is large, a lateral expansion or shrinkage occurs on the screen.

The present invention provides an apparatus which can always generate the stable and constant frequency write clock and eliminate the skew distortion. The oscillation frequency of the clock generator 132 in FIG. 10 is rendered to be equal to the oscillation frequency of the clock generator 140 by the PLL circuit. The stable write clock generator may be the write clock generator 400 shown in FIG. 1, and the circuit 300 and 400 of FIG. 1 may be used in place of the circuits 130, 131 and 132 of FIG. 10 so that the stable write clock without frequency deviation is produced.

As described hereinabove, according to the present invention, the sampling clock which exactly follows the time base error in the video signal is produced stably and without frequency deviation and the time base error can be positively eliminated without graphic distortion.

In accordance with the present invention, the discontinuity of the signal in the video information signal period, which is usually caused when the head is switched in the helical scan type magnetic recording and reproducing apparatus is prevented and the horizontal synchronization signals are properly arranged at the predetermined interval. Thus, the skew distortion is completely eliminated.

Further, since the frequency of the write clock and the frequency of the read clock are controlled by the PLL circuit so that they are equal, the lateral graphic distortion due to sampling is prevented and the skew distortion is fully eliminated.

Further, when the present invention is applied to the high-quality image recording and reproducing apparatus, the skew distortion in the effective field is eliminated and more advantage is expected.

What is claimed is:

1. A skew correction circuit for correcting a skew error included in an input signal, said input signal being a video signal which is recorded on and reproduced from tracks on a magnetic tape at each predetermined interval, said track for recording being formed on the tape at a predetermined inclination by a plurality of rotary heads, the video signal thus recorded and reproduced having a skew error such that a time base changes stepwise, comprising:
   (a) separation means for separating synchronization information included in said input signal;
   (b) a write clock signal generating circuit means for generating write clock signals, including an oscillation circuit generating write clock signals, a reference signal generating circuit generating a reference signal, a phase comparator circuit for comparing the reference signal of said reference signal generating circuit or a frequency-divided signal thereof with said write clock signal of said oscillation circuit or a frequency-divided signal thereof so as to output a phase error signal corresponding to a phase difference as the comparison result, voltage control means for voltage controlling the oscillation frequency of said oscillation circuit, and feedback means for negatively feeding back said phase error signal to said voltage control means;
   (c) synchronization information supplying means for injecting said separated synchronization information to said oscillation circuit to synchronize the phase of starting of oscillation by said oscillation circuit with the phase of said synchronization information and for controlling the oscillation for an interval when the injected synchronization is absent;
   (d) read clock signal generating circuit for generating read clock signals having a stable frequency;
   (e) a memory in which said input signal sequentially sampled is written in accordance with said write clock signals and is then sequentially read out in accordance with said read clock signals;
   (f) counter means for counting said write clock signals and outputting a signal indicating the termination of sampling when the count reaches a predetermined value;
   (g) head switching signal receiving terminal means for receiving a head switching signal for controlling the timing of switching of said plurality of rotary heads, and
   (h) latch means connected with said counter means and said head switching signal receiving terminals means for latching the head switching signal by the sampling termination signal from said counter means, and for generating a latched head switching signal, whereby said plurality of rotary heads are switched sequentially in accordance with the latched head switching signal.

2. A skew error correction circuit according to claim 1, wherein said synchronization information supplying means comprises a monostable multivibrator.

3. A skew error correction circuit according to claim 1, wherein said synchronization information supplying means comprises a delay circuit.

4. A skew error correction circuit according to claim 1 further comprising:
   detection means connected with said synchronization information supplying means for detecting at least a portion of a vertical blanking period contained in said input signal; and
   gating means included in said feedback means, whereby said phase error signal is negatively fed back to said voltage control means in only said vertical blanking period in accordance with the output of said detection means.

5. A skew error correction circuit according to claim 4, wherein said separation means includes a horizontal synchronization signal separation circuit and a vertical synchronization signal separation circuit.

6. A skew error correction circuit according to claim 5, wherein said detecting means includes a monostable multivibrator triggered by the vertical synchronization signal separated at said vertical synchronization signal separation circuit, and a latch circuit latching the output signal of the monostable multivibrator in accordance with the output signal of the horizontal synchronization signal separation circuit.

7. A skew error correction circuit according to claim 1, wherein said oscillation circuit comprises a monostable multivibrator with an enable terminal.

* * * * *